United States Patent
Benedetto et al.

(10) Patent No.: US 7,293,105 B2
(45) Date of Patent: Nov. 6, 2007

(54) METHODS AND APPARATUS FOR IMPLEMENTING A HIGH AVAILABILITY FIBRE CHANNEL SWITCH

(75) Inventors: Marco Di Benedetto, Santa Clara, CA (US); John B. McEwan, Redwood City, CA (US); Ramana Mellacheruvu, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 731 days.

(21) Appl. No.: 10/026,311

(22) Filed: Dec. 21, 2001

(65) Prior Publication Data

US 2003/0135642 A1 Jul. 17, 2003

(51) Int. Cl.
*G06F 15/173* (2006.01)
(52) U.S. Cl. .................... 709/238; 714/12; 719/313
(58) Field of Classification Search ............... 709/248, 709/238, 240, 221, 227, 228, 241; 714/6, 714/12; 719/313
See application file for complete search history.

(56) References Cited

U.S. PATENT DOCUMENTS

| | | | | |
|---|---|---|---|---|
| 5,210,871 A | * | 5/1993 | Lala et al. ................. | 710/116 |
| 5,857,113 A | * | 1/1999 | Muegge et al. ............. | 710/10 |
| 5,922,077 A | * | 7/1999 | Espy et al. ................. | 714/7 |
| 6,003,075 A | * | 12/1999 | Arendt et al. ............... | 709/221 |
| 6,070,251 A | * | 5/2000 | Chong ....................... | 714/12 |
| 6,128,750 A | | 10/2000 | Espy et al. | |
| 6,338,110 B1 | * | 1/2002 | van Cruyningen ......... | 710/317 |
| 6,427,163 B1 | * | 7/2002 | Arendt et al. ............... | 709/201 |
| 6,601,187 B1 | * | 7/2003 | Sicola et al. ................ | 714/6 |
| 6,816,905 B1 | * | 11/2004 | Sheets et al. ............... | 709/226 |
| 6,876,652 B1 | * | 4/2005 | Bell et al. ................... | 370/386 |
| 6,931,487 B2 | * | 8/2005 | Lubbers et al. ............. | 711/114 |
| 2001/0002193 A1 | | 5/2001 | Fourie et al. | |
| 2002/0016827 A1 | * | 2/2002 | McCabe et al. ............ | 709/213 |
| 2002/0019958 A1 | | 2/2002 | Cantwell et al. | |
| 2002/0095489 A1 | * | 7/2002 | Yamagami ................. | 709/224 |
| 2002/0176648 A1 | * | 11/2002 | Bhat et al. ................. | 385/15 |

(Continued)

FOREIGN PATENT DOCUMENTS

WO 01/35244 A1 5/2001

(Continued)

OTHER PUBLICATIONS

International Search Report, Application No. PCU/US02/40512, Mailed May 19, 2003; 4 pages.

(Continued)

*Primary Examiner*—Patrice Winder
*Assistant Examiner*—Asghar Bilgrami
(74) *Attorney, Agent, or Firm*—Beyer Weaver LLP

(57) ABSTRACT

High availability for a fibre channel switch in a storage area network can be implemented using redundant supervisors. An active supervisor can identify high availability characteristics associated with a message and determine whether the message should be mirrored onto a redundant supervisor, logged, and/or made persistent. Messages can be logged in a pending transaction buffer and stored using persistent storage services. Mirroring can be performed using synchronization queues that allow messages to be passed asynchronously to a redundant supervisor while maintaining full synchronization between supervisors and causing little delay to operation of the active supervisor.

37 Claims, 11 Drawing Sheets

U.S. PATENT DOCUMENTS

2002/0194324 A1* 12/2002 Guha .................... 709/223
2003/0016624 A1*  1/2003 Bare .................... 370/217
2003/0093570 A1*  5/2003 Bissett .................. 709/248

FOREIGN PATENT DOCUMENTS

WO        WO0135244        5/2001

OTHER PUBLICATIONS

Marco Di Benedetto, Mrinal Baruah, Chengelpet V. Ramesh, Alagu Annaamalai, Ramana Mellacheruvu, Sridhar K. Aswathnarayan, Hei T. Fung, And Umesh Mahajan, "High Availability Architecture for Network Devices", U.S. Appl. No. 09/714,246, filed Nov. 16, 2000.

Mahajan et al., of Andiamo Systems, Inc., European Patent Application No. 02794294.5, European Search report dated Feb. 24, 2005.

* cited by examiner

Figure 4

| Message | Persistent | Logged | Mirrored |
|---|---|---|---|
| Domain Invalidate | Y | Y | Y |
| Time | N | N | N |
| ... | ... | ... | ... |

401, 403, 405, 407 (column headers)
411, 413, 415, 417 (rows)

METHODS AND APPARATUS FOR IMPLEMENTING A HIGH AVAILABILITY FIBRE CHANNEL SWITCH

BACKGROUND OF THE INVENTION

1. Field of the Invention

The present invention relates to fibre channel network switches. More specifically, the present invention relates to methods and apparatus for implementing high availability for a fibre channel switch in a storage area network. High availability includes services such as mirroring, logging, persistence, application reinitialization, and switchover.

2. Description of Related Art

Very limited high availability services exist in fibre channel networks. One form of high availability for fibre channel storage area networks is route redundancy. When a first storage area network entity, such as a server, attempts to send a message to a second storage area network entity, such as a disk array in a fibre channel fabric, the message passes through various switches in the fibre channel fabric. If a particular switch fails, neighboring switches can recognize the failure and pass the message along alternative routes. The alternative routes can bypass the failed switch to maintain network operation. However, it may not always be possible to bypass the failed switch. In one example, the failed switch may be directly connected to the target disk array and there may be no alternative routes to the destination. Bypassing the failed switch can also be disruptive to the operation of the fibre channel network. Traffic may be slowed through switches that now have to carry additional traffic. Overall bandwidth of the fabric can decrease.

Many other high availability services fail to preserve state information, causing slow network operation or reinitialization of applications.

It is therefore desirable to provide methods and apparatus for providing high availability in a fibre channel switch and improving high availability services with respect to some or all of the limitations noted above.

SUMMARY OF THE INVENTION

High availability for a fibre channel switch in a storage area network can be implemented using redundant supervisors. An active supervisor can identify high availability characteristics associated with a message and determine whether the message should be mirrored onto a redundant supervisor, logged, and/or made persistent. Messages can be logged in a pending transaction buffer and stored using persistent storage services. Mirroring can be performed using synchronization queues that allow messages to be passed asynchronously to a redundant supervisor while maintaining full synchronization between supervisors and causing little delay to operation of the active supervisor.

According to one embodiment, a method for implementing high availability in a fibre channel switch in a storage area network is provided. A message is identified at a first application running on an active supervisor in a fibre channel switch. High availability characteristics associated with the message are determined. High availability characteristics provide information for synchronizing a second application running on a standby supervisor in the fibre channel switch with the first application. The message is provided to the second application running on the standby supervisor when high availability characteristics indicate that the message should be mirrored.

In one example, subscriber characteristics associated with the message are also determined. Subscriber characteristics provide information for determining which applications running on the active supervisor have subscribed to receive the message.

In another embodiment, a fibre channel switch is provided. The fibre channel switch includes a fibre channel line card coupled to an external fibre channel network entity, a first supervisor coupled to the fibre channel line card through a backplane, and a second supervisor coupled to the first supervisor. The first supervisor is configured to identify a message from the external fibre channel network entity that alters the state of the first supervisor and send an acknowledgement to the external fibre channel network entity before the message is passed to the second supervisor.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

FIG. 4 is a diagrammatic representation of a MTS component.

DETAILED DESCRIPTION OF SPECIFIC EMBODIMENTS

The present invention is related to security in a fibre channel fabric. More specifically, the present invention relates to methods and apparatus for providing high availability switches in a fibre channel fabric.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of a particular fibre channel switch architecture. However, it should be noted that the techniques of the present invention can be applied to a variety of different switch architectures with a number of different components and systems. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
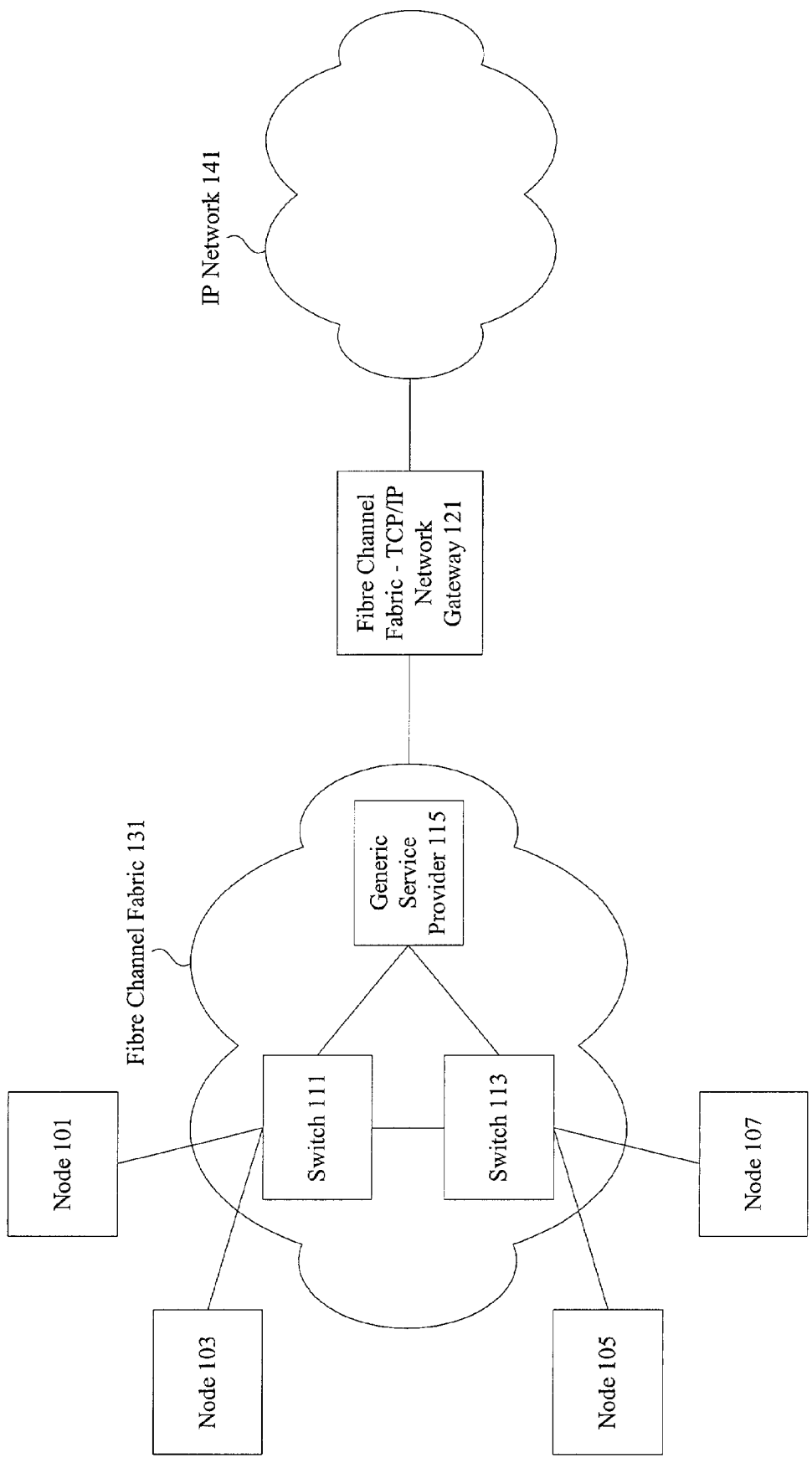
FIG. 1 is a diagrammatic representation of a network that can use the techniques of the present invention.

FIG. 1 is a diagrammatic representation of a network that can use the techniques of the present invention. A fibre channel fabric 131 can include a number of network entities such as switches 111 and 113 as well as a generic service provider 115, which may be yet another switch. The switches can be used to interconnect nodes 101, 103, 105, and 107. Nodes 101, 103, 105, and 107 can be entities such as servers, tape libraries, RAIDS, disk arrays, or just a bunch of disks (JBOD). The fibre channel architecture shown in FIG. 1 is a switch-based architecture. However, it should be noted that fibre channel networks can be implemented using a variety of different architectures such as arbitrated loop and point-to-point.

In one embodiment, the fibre channel network 131 is a storage area network connected to a conventional IP network 141 through a device such as a fibre channel to IP gateway 121. High availability in fibre channel storage area networks has typically been provided using alternative routes. When a particular switch fails, traffic configured to traverse the failed switch is rerouted to an alternative switch. Routing traffic to an alternative switch, however, is disruptive and decreases available bandwidth in the storage area network. According to various embodiments, various techniques for providing high availability within a single fibre channel switch are provided. Mechanisms such as redundancy for making a switch highly available will be referred to herein as high availability.

Figure 2:
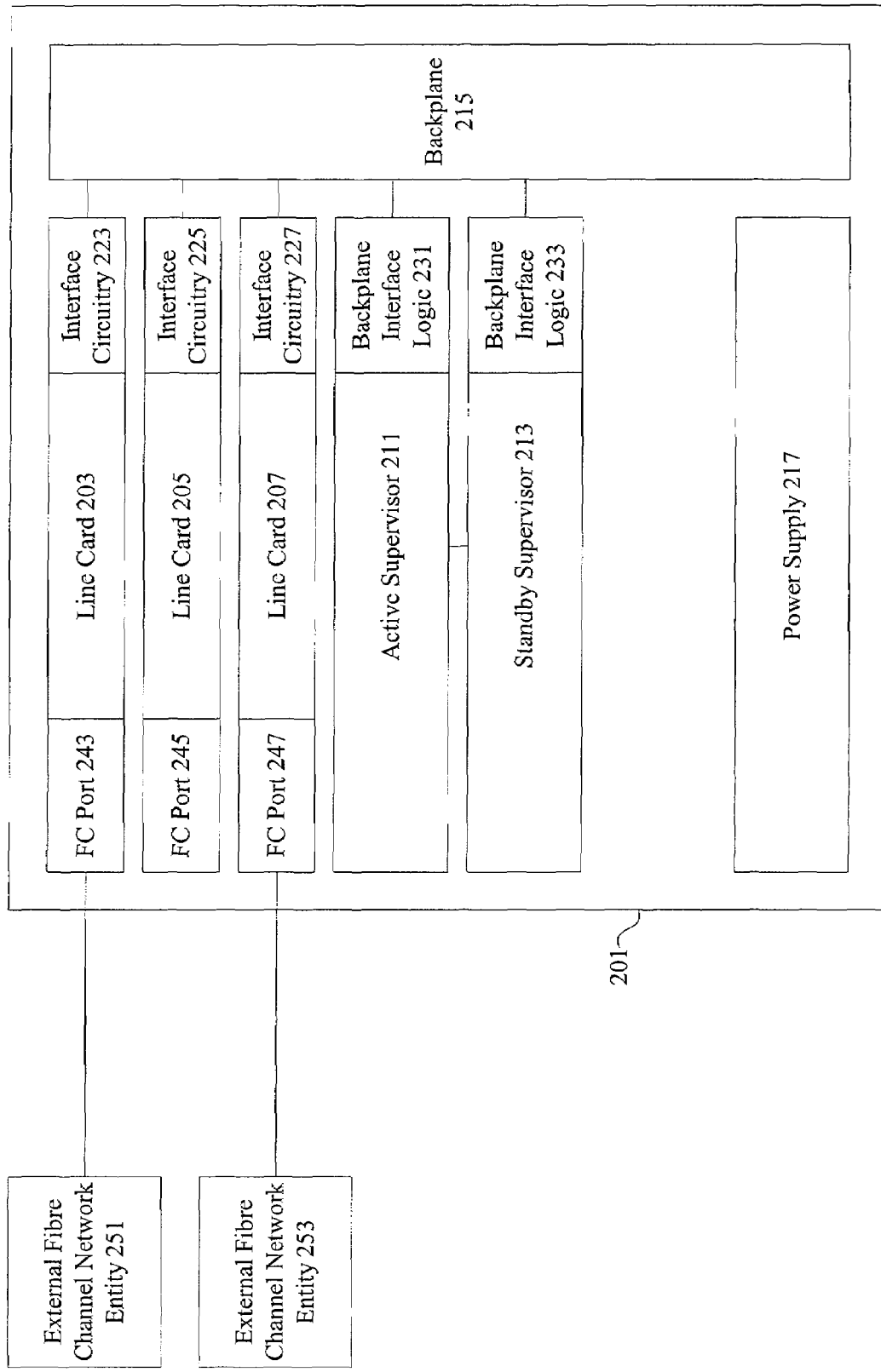
FIG. 2 is a diagrammatic representation of a switch that can implement the techniques of the present invention.

FIG. 2 is a diagrammatic representation of a fibre channel switch that can be used to implement techniques of the present invention. The fibre channel switch 201 may include one or more supervisors 211 and 213. A system including a processor and its own address space that can be used to direct messages in a fibre channel fabric is referred to herein as a supervisor. In a specific implementation, supervisor 211 is configured as an active or primary supervisor, while supervisor 213 is configured as a standby or backup supervisor that provides for high availability of the fibre channel switch. A backup supervisor can be configured to assume operation of the fibre channel switch 201 when the active supervisor fails. According to various embodiments, each supervisor has its own processor, memory, and storage resources.

In one embodiment, the active supervisor 211 can be connected to the standby supervisor 213 through a direct link separate from a backplane 215 or the supervisors can be connected through a common backplane shared with line cards 203, 205, and 207. The active supervisor 211 can be connected to the backplane 215 through the backplane interface logic 231 and the standby supervisor 213 can be connected to the backplane 215 through the backplane interface logic 233. According to various embodiments, the backplane 215 is an ethernet type network. Line cards 203, 205, and 207 can communicate with an active supervisor 211 through interface circuitry 223, 225, and 227 and the backplane 215. The backplane 215 can provide a communications channel for all traffic between line cards and supervisors. Individual line cards 203 and 207 can also be coupled to external fibre channel network entities 251 and 253 through fibre channel ports 243 and 247. External fibre channel network entities 251 and 253 can be nodes such as other fibre channel switches, disks, RAIDS, tape libraries, or servers.

It should be noted that the switch can support any number of line cards and supervisors. In one embodiment, only a single supervisor is connected to the backplane 215 and the single supervisor communicates with many different line cards.

Figure 3:
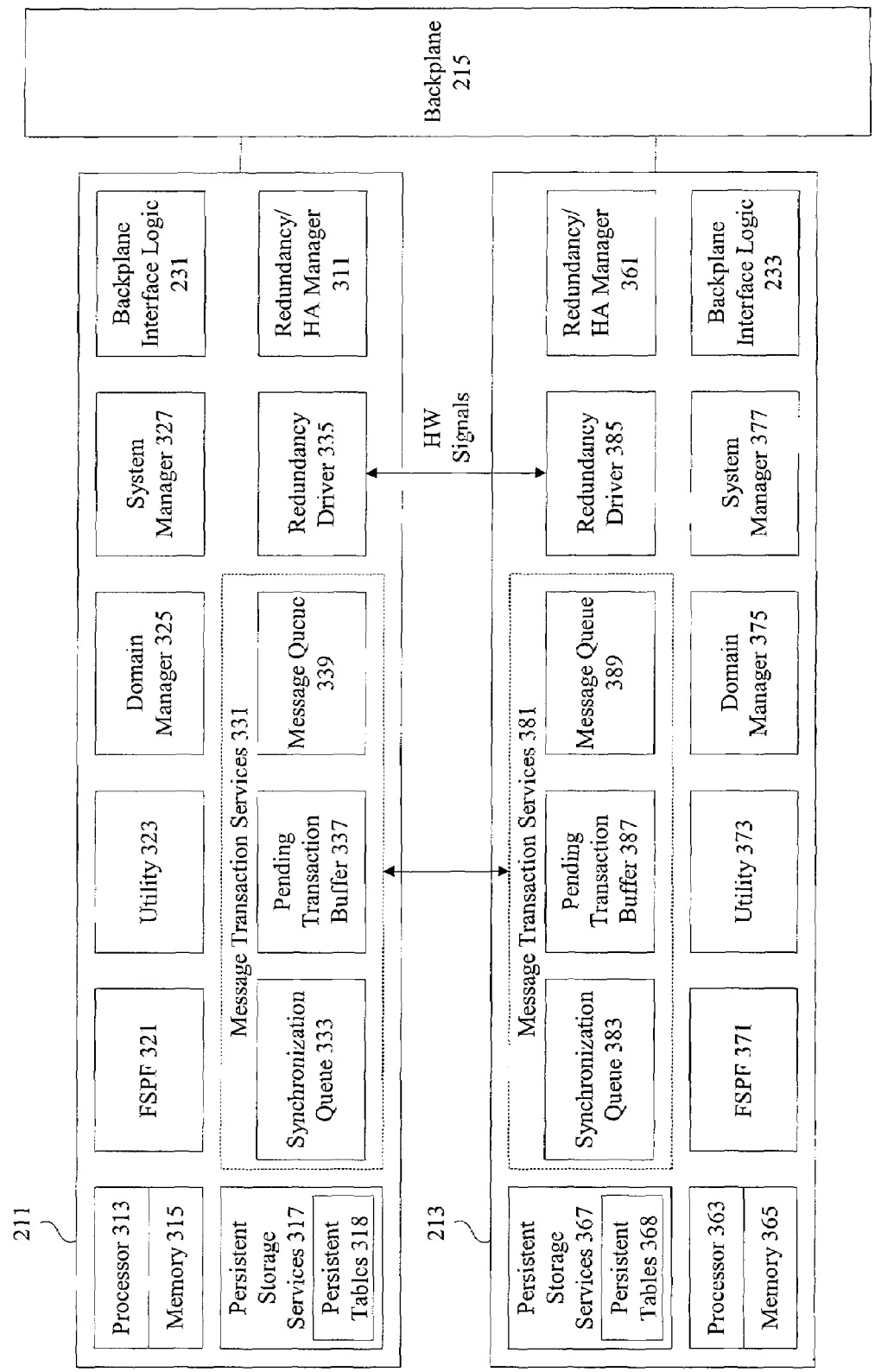
FIG. 3 is a diagrammatic representation of an active and a redundant supervisor running various applications on a fibre channel switch.

FIG. 3 is a diagrammatic representation depicting the active and the standby supervisors shown in FIG. 2. The active and the standby supervisors 211 and 213 can include a variety of similar modules and components, although the supervisors 211 and 213 do not have to be identical. In order to avoid confusion, the various components and modules relating to active supervisor 211 will now be described in greater detail with the understanding that such descriptions may also be applied to the corresponding components and modules of standby supervisor 213.

According to a specific embodiment, the active supervisor 211 may be configured or designed to run a plurality of applications such as routing 321, domain manager 325, system manager 327, and utility 323 applications. According to one embodiment, the routing application 321 is configured to provide message forwarding and routing functionality. A utility application 323 can be configured to provide system clock and timestamp functionality. A domain manager application 325 can be used to assign domains in the fibre channel storage area network. Various supervisor applications may also be configured to provide functionality such as quality of service (QoS) functionality for various fibre channel protocol layers.

The system manager can be configured to launch and monitor various applications. According to various embodiments, the system manager application is used to launch the various other applications in a supervisor. The system manager may also be the only application aware of whether an application is in an active supervisor or a standby supervisor. In one specific implementation, the system manager is responsible for implementing high availability policies for the various applications. The system manager can spawn the processes, monitor process health, and restart various applications whenever an application fails. The system manager can also be responsible for determining when a switch over to a standby supervisor might be preferred over the restart of an application. That is, the system manager can determine the severity of the failure to determine whether to restart an application or to shift control from an active supervisor to a standby supervisor. In one example, any component that wishes to start an application starts the application through the system manager.

According to various embodiments, the request to start the application through the system manager includes a high availability policy applied to the specific application. One example of a high availability policy is to do nothing when the process or application terminates. The system manager then does not need to restart an application when the application terminates. Another example of a high availability policy is to restart the application. If the restart of the application does not survive for more than a predetermined number of seconds, the restart attempts cease and switch over can be attempted. The system manager can then switch activity over to the standby supervisor. It should be noted that applications can be started by the system manager at various times such as during a boot sequence or when explicit requests from other applications are received.

The active supervisor 211 can also comprise a processor 313 coupled to memory 315. It should be noted that components have been described in singular form for clarity. One skilled in the art would appreciate that multiple processors and a variety of memory formats can be used in this context as well as in other contexts while falling within the scope of the present invention. The memory 315 may comprise synchronous dynamic random access memory (SDRAM) storage locations addressable by the processor 313 for storing software programs and data structures accessed by the components.

The supervisor not only includes memory, but the supervisor can also include persistent storage services 317 for holding application or system information such as state information or other application specific or system data. It should be noted that any service configured to provide persistent storage for various applications is referred to herein as a persistent storage service. According to various embodiments, any application can bind to persistent tables 318 associated with persistent storage services 317. Data structures and mechanisms for maintaining information such as state information persistently in a fibre channel switch are referred to herein as persistent tables.

Each persistent table 318 can be associated with a unique identifier. When a first incarnation of an application attempts binds to a particular table associated with the application, the table may not yet exist and is consequently created by the persistent storage services 317. The persistent table 318 associated with the particular application can then be populated during the running of the application. If application crashes or otherwise terminates, the persistent table 318 can remain. A next incarnation of the application can then attempt to bind to the same table. The result of the bind is that the newly spawned application can have access to the data stored in the existing persistent table 318 by the previous incarnation of the application.

In one example, a persistent table allows the newly spawned application to have immediate access to state information stored by the previous incarnation of the application. This can allow the newly spawned application to continue operating without interruption. It should be noted that persistent tables need not be in a particular table format. The persistent tables can be text or raw data files, in one example. Furthermore, the persistent storage services 317 itself does not need to know what is stored in the persistent tables 318. It should be noted, that the persistent tables can be organized in a way that is different from the run-time database of each application. According to various embodiments, the persistent tables can provide information to complement information in various run-time databases.

The active supervisor 211 can also include a redundancy driver 335 coupled to a redundancy and high availability manager 311. A redundancy driver 335 can be coupled to a redundancy driver 385 in a standby supervisor. Various hardware signals can be used to communicate the availability of each system.

According to various embodiments, the active supervisor can also include MTS 331. Any mechanism for passing messages between applications in an active supervisor as well as for passing messages between active and standby supervisors in a persistent and shared manner is referred to herein as MTS.

As will be appreciated by one of skill in the art, applications can communicate with each other using existing mechanisms commonly referred to as sockets and message queues. In an implementation using sockets, a buffer is allocated in the kernel memory space. An application wishing to send a message to another application copies the message from the application space to the buffer in the kernel space. The message is then copied from the kernel buffer into the target buffer associated with the destination. The sockets, however, have several disadvantages. The message copying from the application space to the kernel space and back to the application space is a resource intensive process. Furthermore, sockets are a point-to-point mechanism that typically only allows a single application to communicate with another single application. Sockets are also transient. That is, if there are any problems with the sockets, information is lost. In a socket architecture, it is difficult to recover lost messages resulting from problems with various sockets.

Another mechanism for applications to communicate with each other is commonly referred to as message queues. A global buffer is allocated in the kernel space. Messages from applications are copied into the global buffer. If an application terminates, the message survives as long as the global buffer survives. However, message queues still only allow a single application to communicate with another single application.

According to various embodiments, the techniques of the present invention provide MTS 331 that allocate a message queue 339 for any communication between an application and one or more target applications. The MTS 331 also allows communication between supervisors. The message queue 339 can be a global queue that allows access by multiple target applications. In one example, the message queue 339 provides a reference to the domain manager 325 and a utility application 323 allows the two applications to access a message in the message queue 339. The message in the message queue 339 does not need to be copied to the target applications. The MTS 331 also provides a pending transaction buffer 337 for holding messages that have been accessed in the message queue 339 but have not yet been processed by a particular thread associated with an application.

In one example, a pending transaction buffer 337 holds messages that have been dequeued from the message queue 339 but have not been processed in the application space by all the applications with access to the message. The MTS 331 also includes a synchronization queue 333 that allows messages processed in an active supervisor 211 to be asynchronously synchronized with a standby supervisor 213. That is, messages are synchronized to a standby supervisor without delay in operation on an active supervisor. In typical implementations, if an active supervisor received a message from an external entity, the active system would not respond to the external entity until the message was forwarded to the standby system and the active system received a response from the standby system. This purely synchronous technique, however, delays operation of the active system during the wait for a response from the standby system.

According to techniques of the present invention, the active supervisor can immediately respond to an outside entity without having to wait for response from the standby supervisor while still providing synchronization between the active supervisor of the standby supervisor by using synchronization queues. More detail about MTS and synchronization queues will be provided below.

Figure 4:
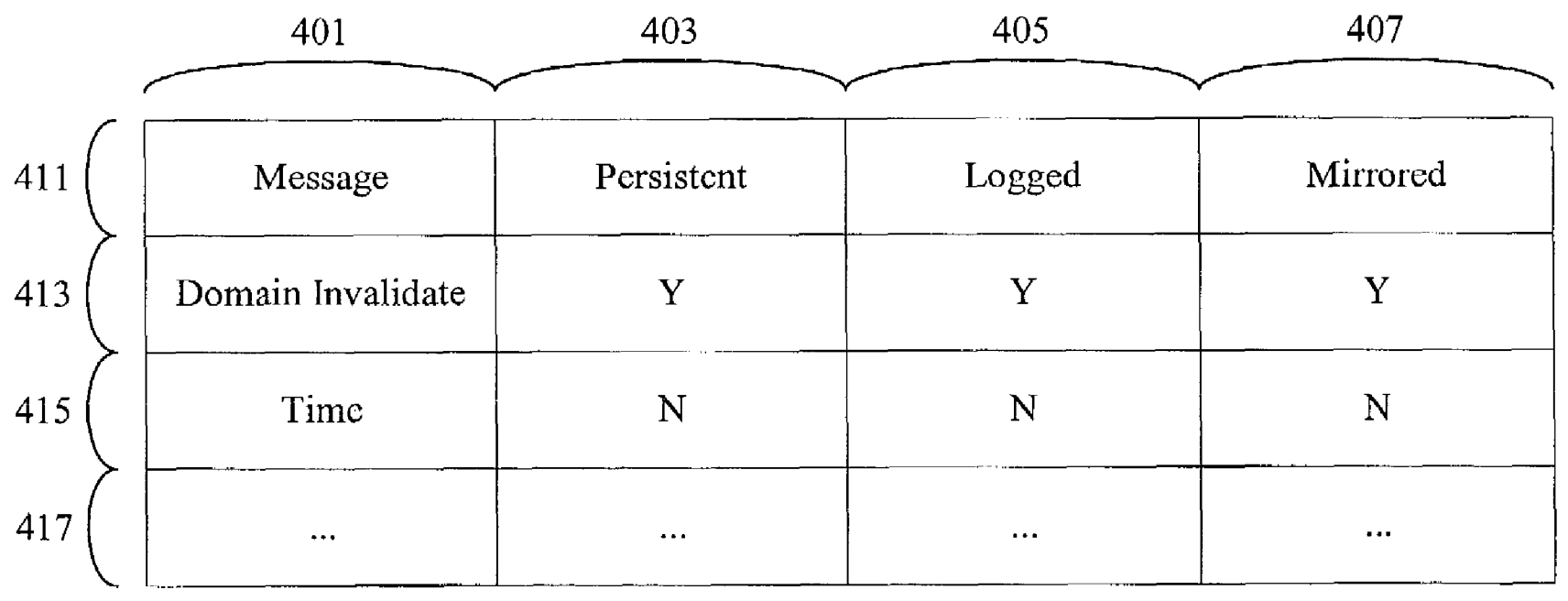

As noted above, MTS 331 is configured to allow an application to communicate with multiple applications within the supervisor as well as to allow different supervisors to communicate with each other. MTS 331 can also be configured to provide high availability services. To provide high availability services in one example, MTS 331 identifies high availability characteristics of each message. FIG. 4 is a diagrammatic representation of high availability characteristics that a message 401 may have. A message may be persistent 403, logged 405, and mirrored 407. Any characteristic used to provide high availability services is referred to herein as a high availability characteristic.

A persistent message is typically a message that causes a change in state. For example, a domain invalidate message may cause a change in state in various applications running on an active supervisor. If an application were to crash while the message was still in a message queue, it would be desirable for the message to persist through the crash and restart of the application. If the message were not persistent, an application would crash and the next incarnation of the application would not be able to receive the state altering event and consequently could have a different state than other entities.

A log message is typically a message that results in an update of a persistent table. After a message is dequeued from a message queue, the message may not instantaneously be processed and committed to a persistent table. If an application crashes after a message is dequeued but before an update is made to a persistent table, the persistent table may be inconsistent with that of outside entities. According to various embodiments, messages that may be used to update a persistent table are marked as log. When an application terminates, the log message remains and a future incarnation of the application can access the dequeued message and update the persistent table.

A message may also have a high availability characteristics of mirroring. If a message should be mirrored, a MTS component on an active supervisor can attempt to pass the message to the MTS component of a standby supervisor. Messages with the high availability characteristics of mirroring are also typically messages that cause changes in state or update to a persistent table. Examples of messages that a persistent but not mirrored at any "get" message requests. According to various embodiments, when an application sends a "get" request for some data to a server, the server may have to reply, thus making the message persistent, but the server does not need to synchronize the information. The retrieved data may be used by the client to update tables. Messages that are mirrored but not logged can include messages that are not changing the state of the server. It should be noted that persistence and log options exist independently for the same message for the server and client.

The MTS component can also be configured to identify applications set to receive a message in a message queue. As noted above, applications subscribe to particular messages of interest. For example, a utility application may subscribe to any message relating to a domain update. A MTS component keeps track of the relevant subscriber characteristics associated with each message or message type. Data and information for identifying which subscribers are configured to receive certain messages are referred to herein as subscriber characteristics. When the received communication has a particular subscriber characteristic, e.g. is a particular message type, the MTS component forwards the message to any subscribers.

Figure 5A:
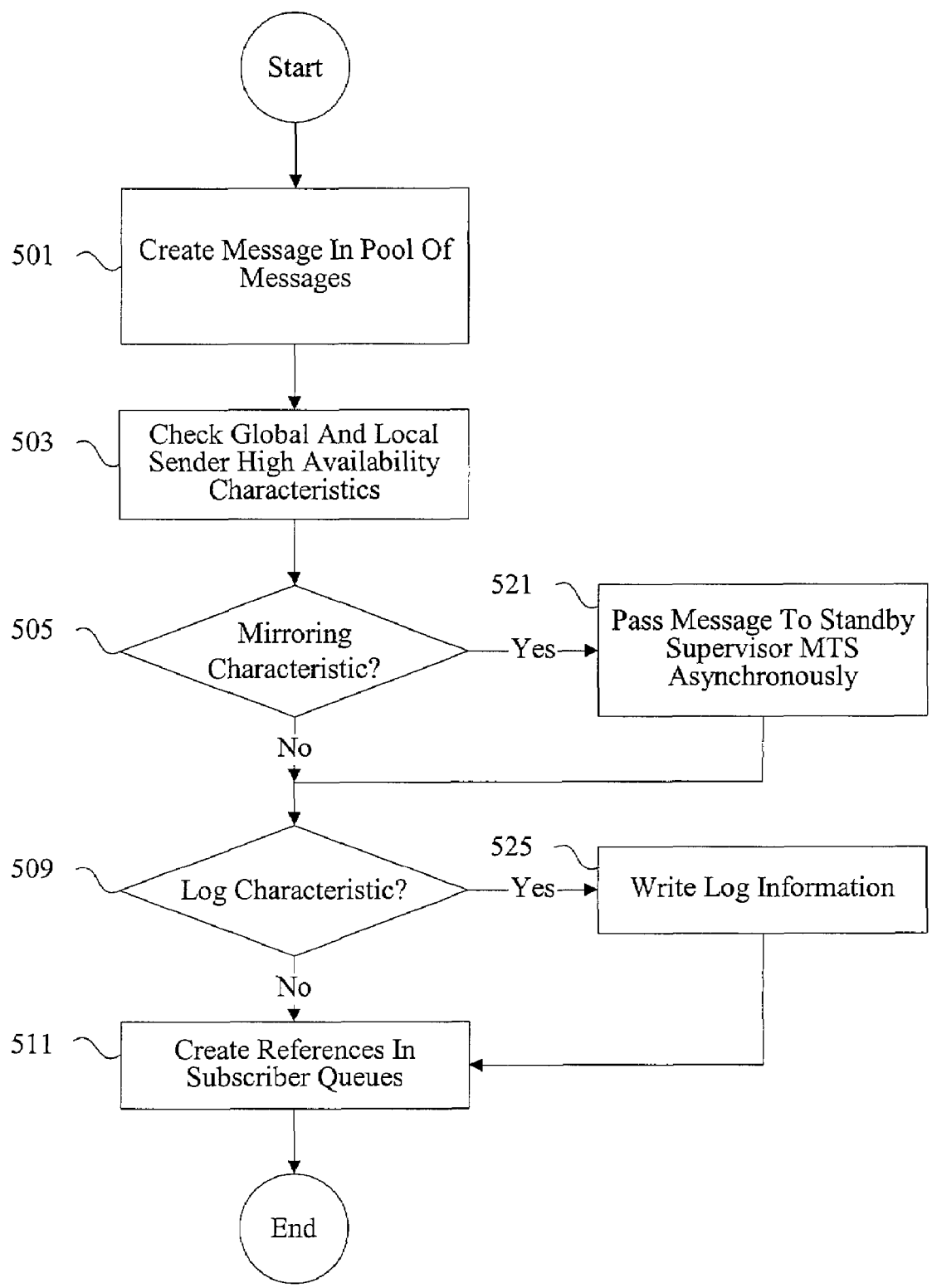
FIGS. 5A-5B are process flow diagrams showing transactions between the active and standby supervisors.
Figure 5B:
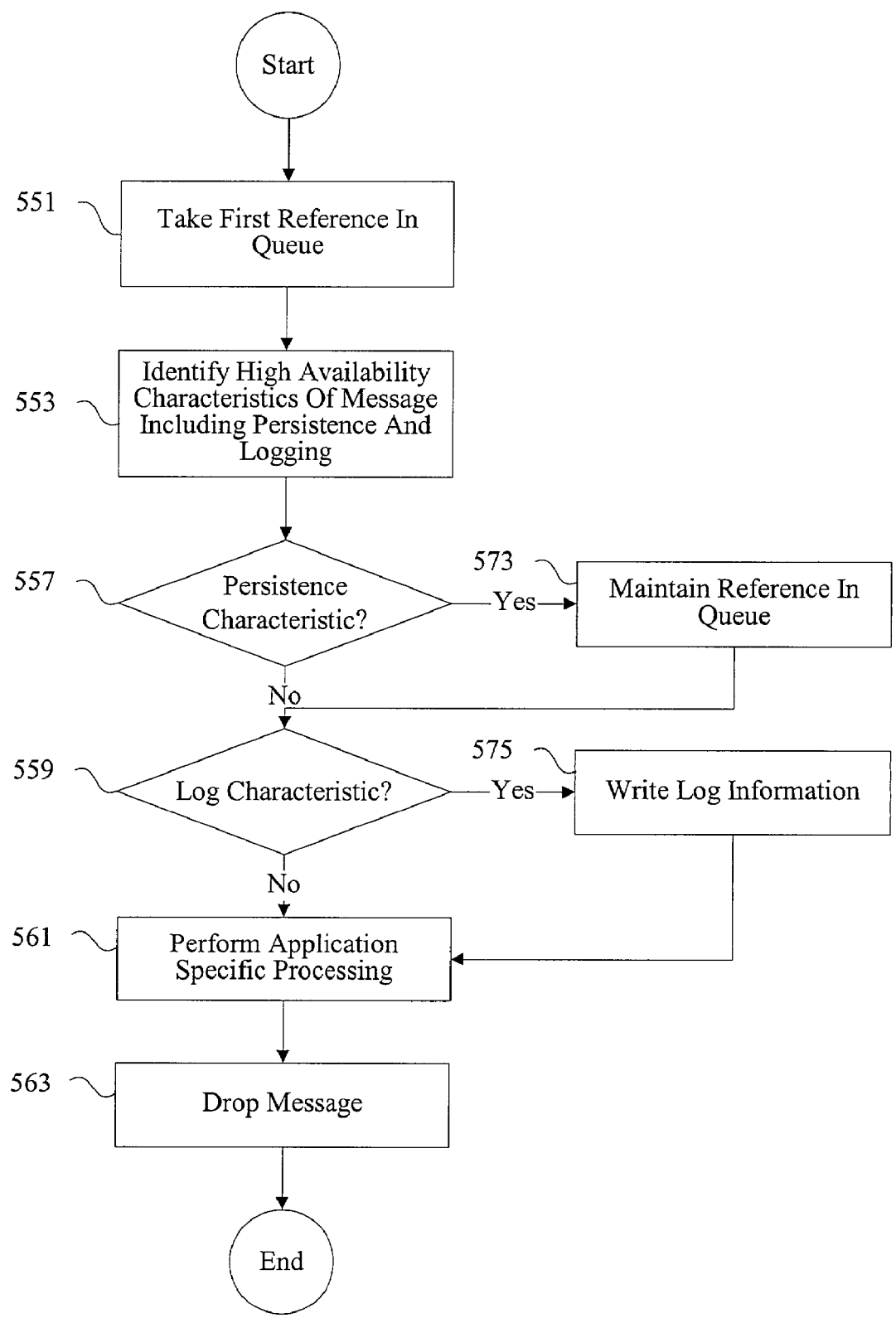

FIGS. 5A and 5B are process flow diagrams showing transactions between an active and a standby supervisor. FIG. 5A shows a process flow at a sender. At 501, a message is created in a shared pool of messages. At 503, global and local sender high availability characteristics are identified. According to various embodiments, messages are associated with characteristics such as mirroring, logged, and persistence as noted above. If at 505 it is determined that the message has a mirroring characteristic, at 521 the message is passed to the standby supervisor MTS component asynchronously. According to one embodiment, message is passed using synchronization queues. More detail about passing the message to a standby supervisor using synchronization queues will be provided below.

At 509, it is determined if the message has a logged characteristic. If it is determined that the message has a logged characteristic, log information is written at 525 into a pending transaction buffer when the message is dequeued but not yet committed to a persistent table. The message can be passed to various subscribers at 511 by creating reference in subscriber queues to the message in the message pool.

FIG. 5B shows a process flow at a receiver. At 551, the first reference in a subscriber queue is extracted. The reference allows the subscriber to access a message in the shared pool of messages. At 553, high availability characteristics such as persistence and log characteristics are identified. If the message has a persistence characteristic at 557, the reference is maintained in the queue at 573. If the message has a logged characteristic at 559, log information is written at 575 and the subscriber can proceed to perform application specific processing using the message at 561. At 563, the message is dropped.

Figure 6:
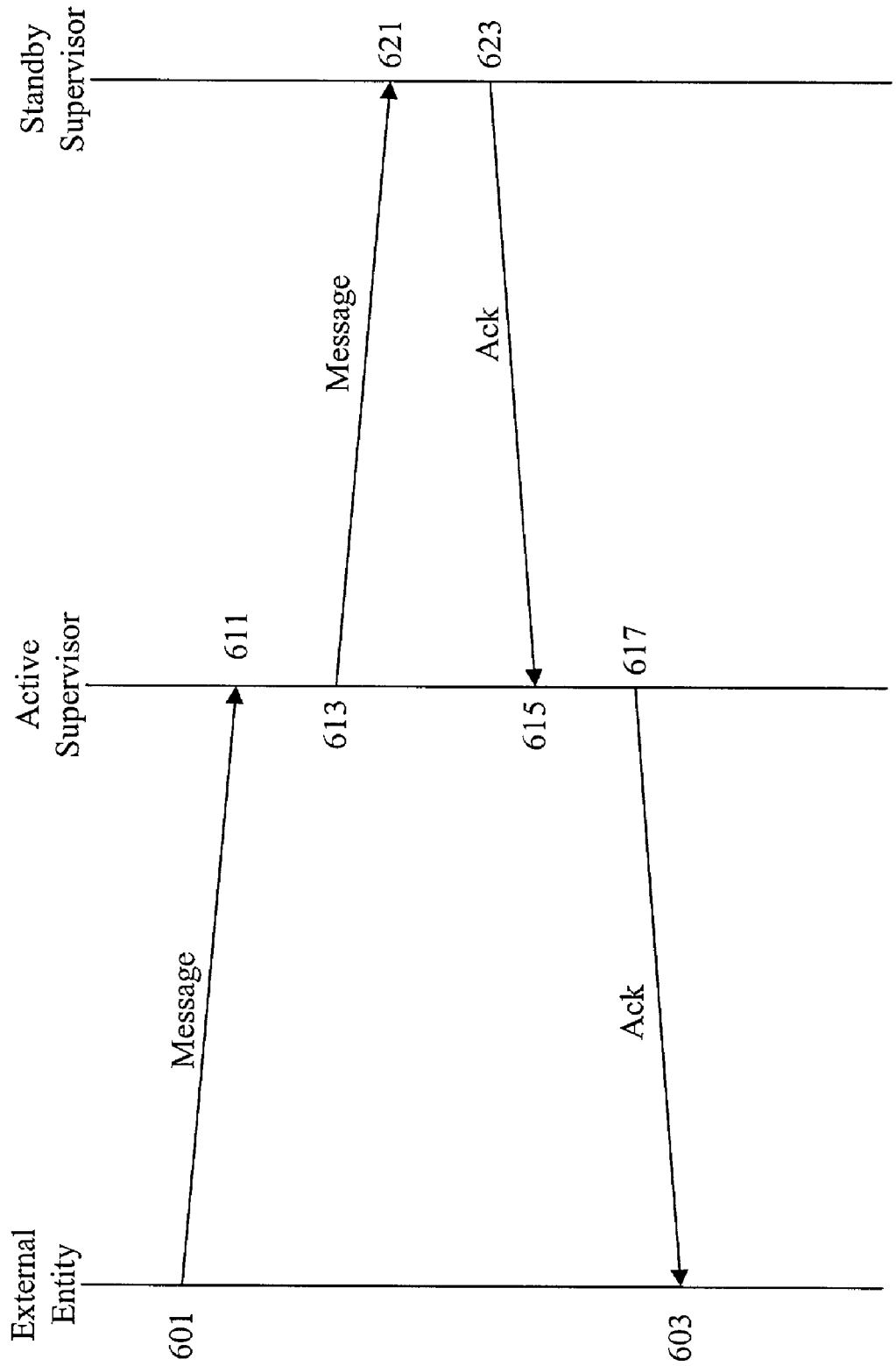
FIG. 6 is a transaction diagram showing the message passing between the active and standby supervisors in lockstep.

FIG. 6 is a transaction diagram showing message passing between active and standby supervisors in lockstep. At 601, an external entity such as an external fibre channel switch sends a message to an active supervisor at 611. In order to maintain synchronous operation, the active supervisor does not immediately send the reply to the external entity. Instead, the active supervisor forwards the message at 613 to a standby supervisor at 621 to synchronize the standby supervisor with the active supervisor. At 623, the standby supervisor sends an acknowledgment or reply to the message to the active supervisor at 615. Upon receiving the acknowledgment or the response, the active supervisor at 617 sends an acknowledgment or response to the external entity at 603. Although this transaction sequence keeps the active and standby supervisors fully synchronized, the response times of the active supervisor are increased because the active supervisor waits for a response from the standby supervisor before sending a response to the external entity. To the external entity, the active supervisor's response time can seem long.

Figure 7:
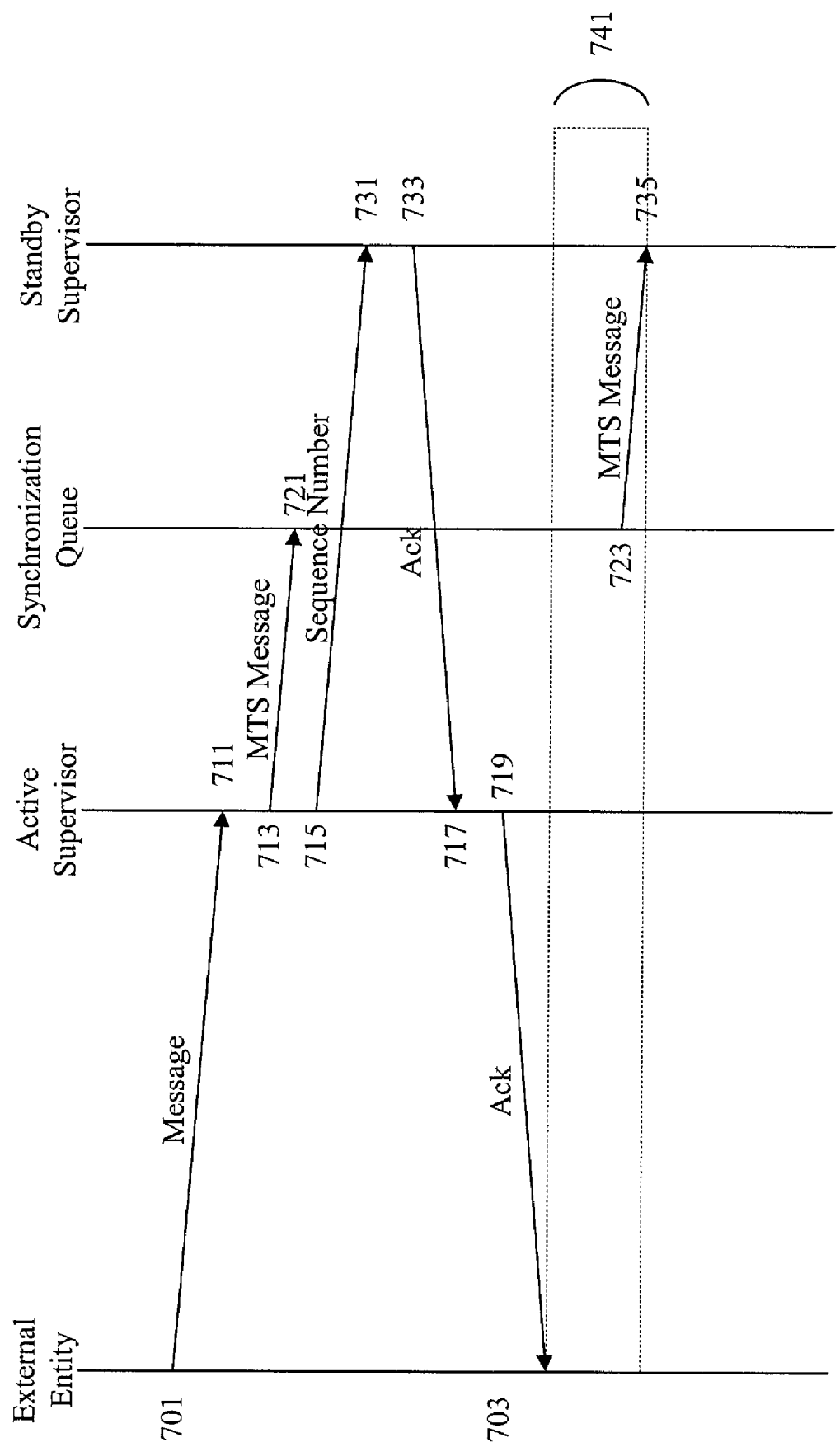
FIG. 7 is a transaction diagram showing the message passing between the active and standby supervisors according to various embodiments.

FIG. 7 is a transaction diagram showing message passing between an active and a standby supervisor according to techniques of the present invention. At 701, an external entity sends a message to an active supervisor at 711. The active supervisor can generate an MTS message at 713 and send it to a synchronization queue at 721. The active supervisor can then proceed to synchronously send a sequence number at 715 to a standby supervisor at 731.

It should be noted that when an active supervisor sends an MTS message to a synchronization queue, there may be other messages in the synchronization queue. The synchronization queue maintains the order of message from an active supervisor.

At 733, a standby supervisor can send an acknowledgement to the sequence number to an active supervisor at 717.

Without waiting for an acknowledgement of the receipt of the MTS message, the active supervisor at 719 can acknowledge the message from the external entity at 703. The MTS message can then be forwarded from the synchronization queue at 723 to a standby supervisor at 735 at a later time.

Although this decreases response times of the active supervisor, the scheme can lead to inconsistent results if a failure occurs between the time the external entity receives an acknowledgment of the message and before the standby supervisor receives the message.

The fault period 741 can lead to inconsistencies in state as the external entity can believe that the standby supervisor has already received and acknowledged a message that the standby supervisor has not actually received. To account for the fault period 741, the active supervisor at 713 sends advance notification to the standby supervisor 731 telling the standby supervisor to expect a message. In one embodiment, the active supervisor at 715 sends a sequence number to standby supervisor 731 telling the standby supervisor to expect a message. If the message at 735 is never received, the standby supervisor can then perform some maintenance operation. In one example, the standby supervisor could ask the external entity to reinitiate the sequence.

Figure 8:
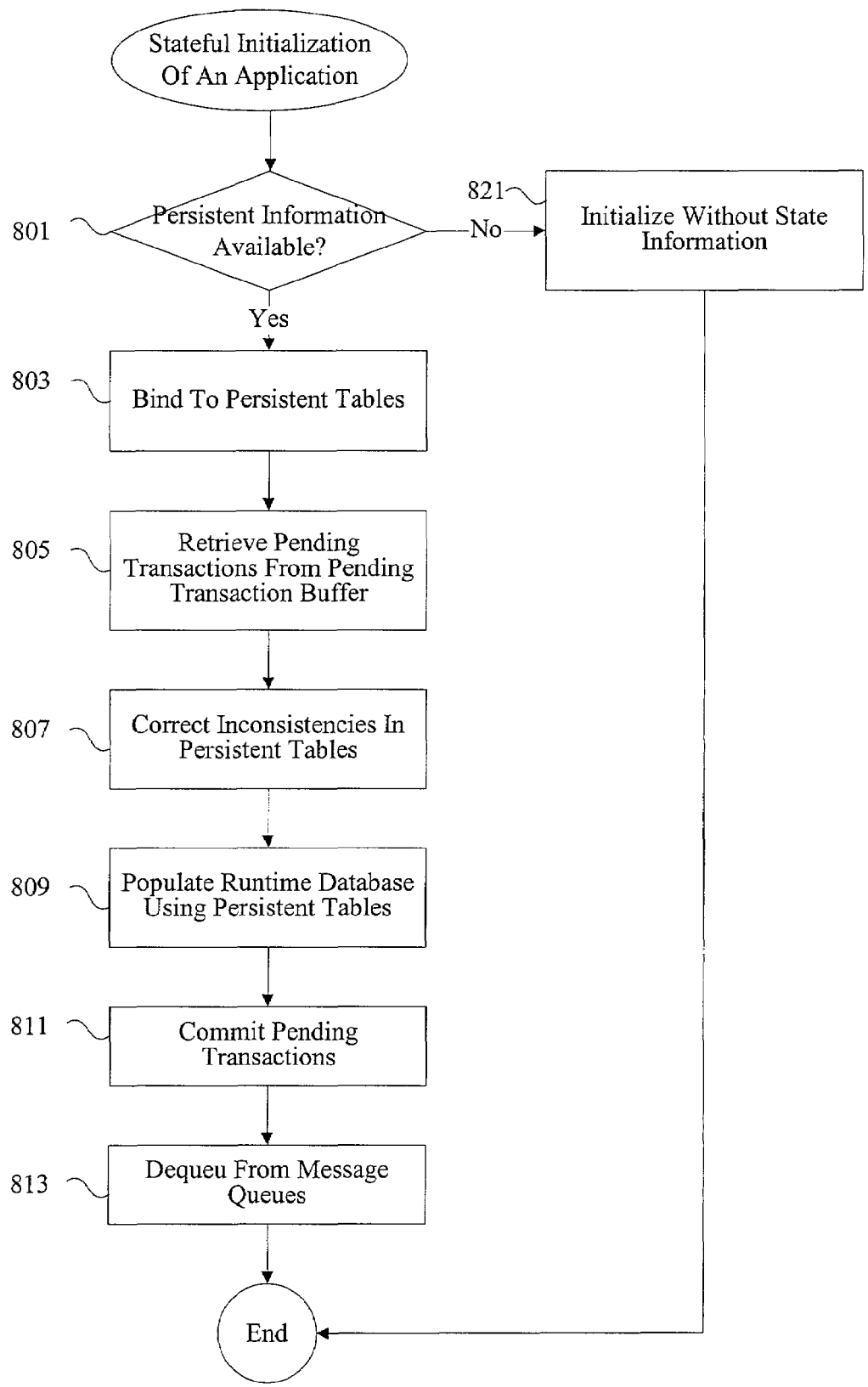
FIG. 8 is a process flow diagram showing the reinitialization of an application on an active supervisor.

FIG. 8 is a flow process diagram showing the stateful initialization of an application. At 801, it is determined if persistent information or persistent tables are available for a particular application. If it is determined that no persistent tables are available, the application is initialized at 821 without state information. If persistent tables are available, the application binds to persistent tables at 803. It should be noted that persistent tables here were created by a prior incarnation of the application. Pending transactions are retrieved from a pending transaction buffer at 805. Inconsistencies in the persistent tables are corrected at 807. At 809, a run-time database can be populated using information from persistent tables. At 811, pending transactions can be committed. At 813, messages in the message queues can then be dequeued.

Figure 9:
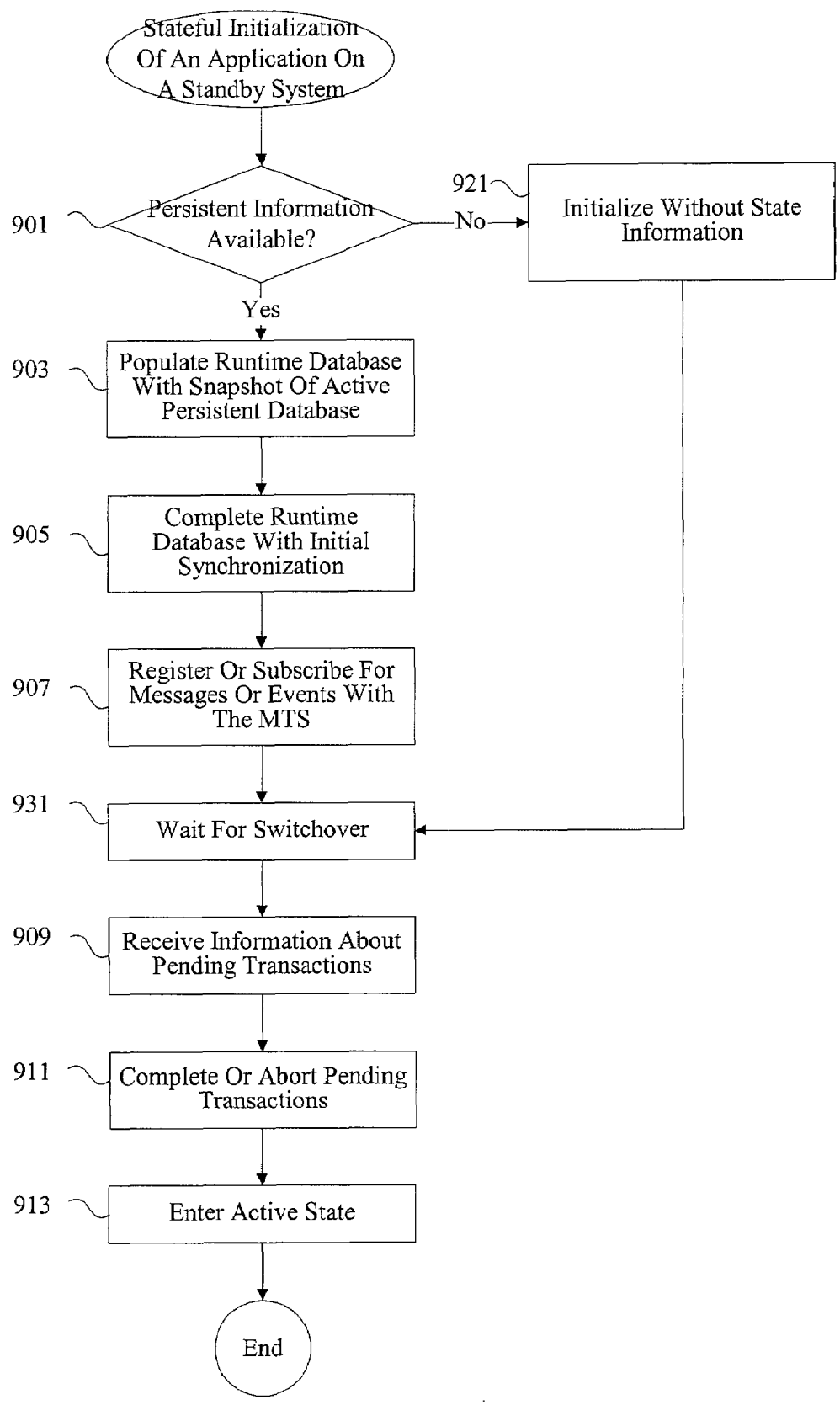
FIG. 9 is a process flow diagram showing the reinitialization of an application on a standby supervisor.

FIG. 9 is a process flow diagram showing the stateful initialization of an application on a standby system. At 901, it is determined if persistent information is available. If no persistent information such as persistent table information is available, the application initializes without state information at 921. At 903, a runtime database associated with the application is populated with a snapshot of the persistent database on the active system. At 905, the run-time database on the standby system can be populated with an initial synchronization. At 907, the application can register or subscribe for messages or events. In one example, the application registers or subscribes for messages with the MTS component. At 931, a switchover is awaited. Upon switchover, the application at 909 can receive information about pending transactions and can complete or abort the pending transactions at 911. At this point, the application on the standby system can enter the active state at 913. FIG. 9 shows a process flow for a switchover-capable application. According to various embodiments, an application can fall in several high availability states such as standby, waiting for recovery, and active.

Figure 10:
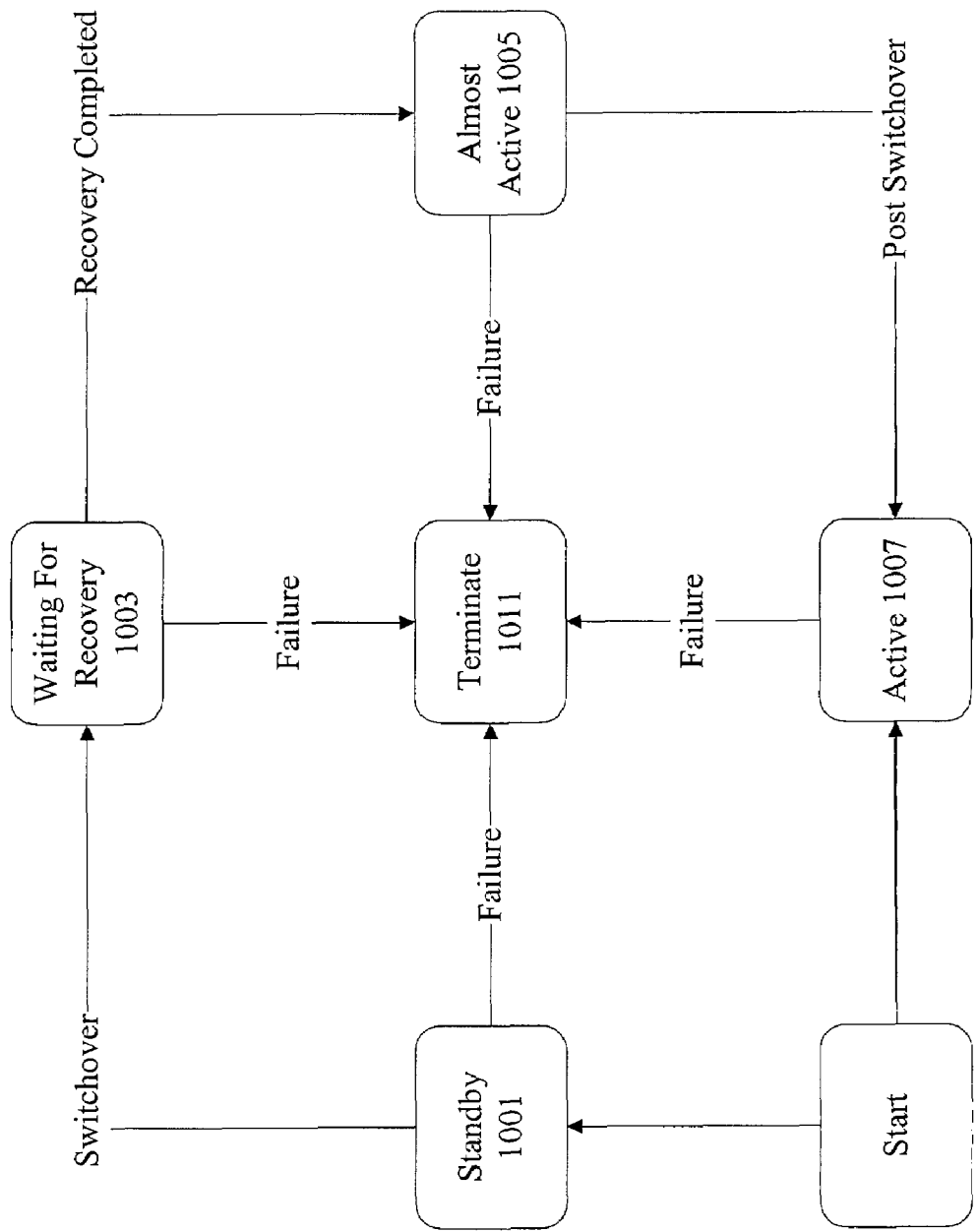
FIG. 10 is a diagrammatic representation showing possible states for an application running on a supervisor.

FIG. 10 is a diagrammatic representation showing the possible states for a switchover-capable application. When an application is run on a standby supervisor, the application starts in standby mode 1001. When the application is in standby mode 1001, it is responsible for updating the runtime context so that it is available when a switchover occurs. According to various embodiments, the updates are driven by the active counterpart of the application.

The initial runtime database can be built using a snapshot of the active persistent database, which gets synchronized by the persistent storage service on request. In order for a snapshot to be consistent, the active counterpart is involved. The active counterpart tells the persistent storage service when it is a good time for an initial synchronization. The application in standby mode can use events to update both the runtime database and the persistent database from the initial snapshot. In one embodiment, no additional synchronization to the persistent database is allowed.

The waiting for recovery state 1003 is entered when a switchover occurs. The waiting for recovery state 1003 is a synchronization point for all standby applications. If an active supervisor has crashed, it may have left some work pending. The message transaction services component informs each application what open transactions remain with the associated active counterpart. The standby application can determine whether the information available is enough to roll forward and complete the transaction or whether the transaction has failed. Completed pending transaction can also be committed in this phase.

When a recovery completed event has been queued in all application queues, each standby application can enter the almost active state 1005. In this state, the application is essentially active, but it is not fully active because for some time the application will receive events that were generated before the producer moved to the active state. After an event such as a post-switchover event, the application enters the active state 1007.

At any time, the application can have a failure condition that forces it to terminate. When an application terminates, the system manager can take different actions. If the application terminates from the standby state 1001, the standby system manager can try to restart the application. If a given number of restart attempts fail, high availability is disabled. If the application terminates from waiting for recovery state 1003, the recovery phase for the application failed and the application is unable to do a proper clean up of the other applications it interacts with, and therefore the state of the entire system may become inconsistent. The system can kill all high availability applications and restart entirely or a single application can be restarted. If the application terminates from the almost active 1005 or active 1007 states, the normal behavior for restartable applications can apply.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, random access memory (RAM), and magnetic tape; optical media such as CD-ROM disks; magneto-optical media such as optical disks; and hardware devices that are specially configured to store and perform program instructions, such as read-only memory devices (ROM) and RAM. The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
receiving a message from a first application running on an active supervisor in a fibre channel switch in a storage area network;
determining high availability characteristics associated with the message, wherein high availability characteristics provide information for synchronizing a second application running on a standby supervisor with the first application, wherein a high availability characteristic table is referenced using a message type to determine persistent, logged, and mirrored characteristics associated with the message;
providing the message to the second application running on the standby supervisor when high availability characteristics indicate that the message should be mirrored; and
writing the message to a pending transaction buffer when high availability characteristics indicate that the message should be logged; and
writing the message to a persistent table when high availability characteristics indicate that the message is persistent.

2. The method of claim 1, further comprising determining subscriber characteristics associated with the message, wherein subscriber characteristics provide information for determining which applications running on the active supervisor have subscribed to receive the message.

3. The method of claim 2, further comprising providing the message to a plurality of subscribers running on the active supervisor.

4. The method of claim 3, wherein providing the message to the plurality of subscribers comprises copying the message to a first supervisor shared buffer.

5. The method of claim 4, wherein providing the message to the plurality of subscribers comprises providing the subscribers with a reference to the message in the first supervisor shared buffer.

6. The method of claim 3, further comprising providing the message to a plurality of subscribers running on the standby supervisor.

7. The method of claim 6, wherein providing the message to the plurality of subscribers comprising copying the message to a second supervisor shared buffer.

8. The method of claim 7, wherein the message is copied to the second supervisor from the first supervisor asynchronously.

9. The method of claim 8, wherein an acknowledgement to the message is sent by the first application before the message is copied to the second supervisor.

10. The method of claim 6, wherein providing the message to the plurality of subscribers running on the standby supervisor comprises providing the subscribers with a reference to the message in the second supervisor shared buffer.

11. The method of claim 1, wherein high availability characteristics relate to mirroring, persistence, and logging.

12. The method of claim 11, further comprising maintaining a first supervisor transaction log if high availability characteristics indicate that the message should be logged.

13. A fibre channel switch, comprising: a fibre channel line card coupled to an external fibre channel network entity; a first supervisor coupled to the fibre channel line card through a backplane; a second supervisor coupled to the first supervisor; wherein the first supervisor is operable to receive a message from the external fibre channel network entity that alters the state of the first supervisor and send an acknowledgement to the external fibre channel network entity before the message is passed to the second supervisor, the first supervisor operable to determine high availability characteristics associated with the message, wherein high availability characteristics provide information for synchronizing the second supervisor in the fibre channel switch with the first supervisor, wherein a high availability characteristic table is referenced using a message type to determine persistent, logged, and mirrored characteristics associated with the message.

14. The fibre channel, switch of claim 13, wherein the first supervisor is further configured to send an advance notification associated with the message to the second supervisor before passing the message to second supervisor.

15. The fibre channel switch of claim 14, wherein the advance notification is a sequence number associated with the message.

16. The fibre channel switch of claim 15, wherein the advance notification is transmitted synchronously before an acknowledgement is sent to the external fibre channel network entity.

17. The fibre channel switch of claim 16, wherein the message is transmitted asynchronously after the message is acknowledged.

18. The fibre channel switch of claim 17, wherein the second supervisor is configured to use the advance notification to verify the consistency of its internal state.

19. The fibre channel switch of claim 14, wherein the first supervisor comprises a first pending transaction buffer.

20. The fibre channel switch of claim 19, wherein the message is copied into the first pending transaction buffer and reference to the message is provided to a first plurality of applications running on the first supervisor.

21. The fibre channel switch of claim 20, wherein the first plurality of applications running on the first supervisor are subscribers to the message.

22. The fibre channel switch of claim 20, wherein the second supervisor comprises a second pending transaction buffer.

23. The fibre channel switch of claim 22, wherein the message is copied into the second pending transaction buffer and a reference to the message is provided to a second plurality of applications running on the second supervisor.

24. The fibre channel switch of claim 23, wherein the second plurality of applications running on the second supervisor are subscribers to the message.

25. The fibre channel switch of claim 23, wherein the first supervisor is an active supervisor and the second supervisor is a standby supervisor.

26. The fibre channel switch of claim 23, wherein the message is copied into the second pending transaction buffer if high availability characteristics of the message indicate that the message should be mirrored.

27. A switch comprising:
means for receiving a message from a first application running on an active supervisor in a fibre channel switch in a storage area network;
means for determining high availability characteristics associated with the message, wherein high availability characteristics provide information for synchronizing a second application running on a standby supervisor in the fibre channel switch with the first application, wherein a high availability characteristic table is referenced using a message type to determine persistent, logged, and mirrored characteristics associated with the message;

means for providing the message to the second application running on the standby supervisor when high availability characteristics indicate that the message a should be mirrored; and means for writing the message to a pending transaction buffer when high availability characteristics indicate that the message should be logged; and means for writing the message to a persistent table when high availability characteristics indicate that the message is persistent.

28. The switch of claim 27, further comprising means for determining subscriber characteristics associated with the message, wherein subscriber characteristics provide information for determining which applications running on the active supervisor have subscribed to receive the message.

29. The switch of claim 28, further comprising means for providing the message to a plurality of subscribers running on the active supervisor.

30. The switch of claim 29, wherein providing the message to the plurality of subscribers comprises copying the message to a first supervisor shared buffer.

31. The switch of claim 30, wherein providing the message to the plurality of subscribers comprises providing the subscribers with a reference to the message in the first supervisor shared buffer.

32. The switch of claim 29, further comprising means for providing the message to a plurality of subscribers running ion the standby supervisor.

33. The switch of claim 32, wherein providing the message to the plurality of subscribers comprising copying the message to a second supervisor shared buffer.

34. The switch of claim 33, wherein the message is copied to the second supervisor from the first supervisor asynchronously.

35. The switch of claim 34, wherein an acknowledgement to the message is sent by the first application before the message is copied to the second supervisor.

36. The method of claim 1, wherein the message is received into the fibre channel switch by the first application and sent by the first application out of the fibre channel switch.

37. The method of claim 1, wherein the message sent by the first application to another application.

* * * * *